UNITED STATES PATENT OFFICE.

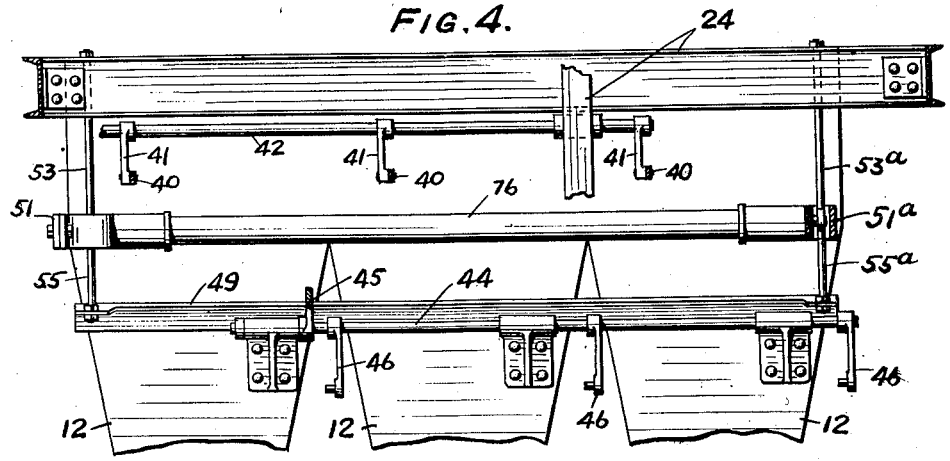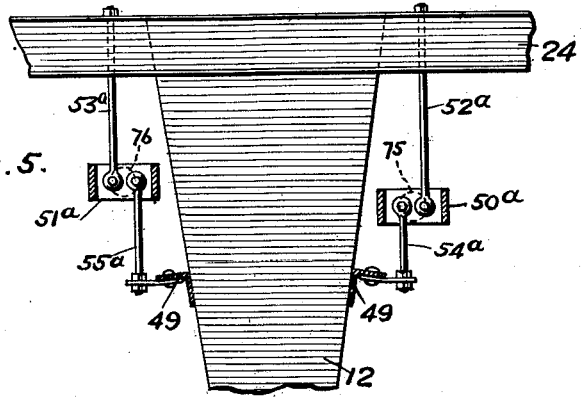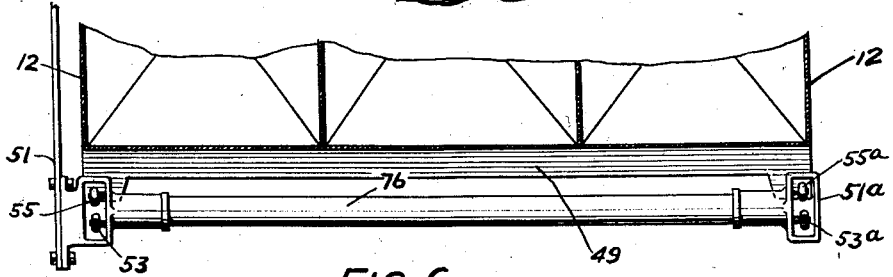

JOHN HAWLEY TAUSSIG, OF PHILADELPHIA, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

MEANS FOR CHARGING VERTICAL RETORTS.

1,140,340.  Specification of Letters Patent.  Patented May 18, 1915.

Application filed January 20, 1913. Serial No. 743,028.

*To all whom it may concern:*

Be it known that I, JOHN HAWLEY TAUSSIG, a citizen of the United States, residing at the city of Philadelphia, in the county of Philadelphia and State of Pennsylvania, have invented certain new and useful Means for Charging Vertical Retorts, of which the following is a specification.

The principal objects of the present invention are, to provide for rapidly charging vertical retorts with charges of pre-determined weight; to facilitate the determination of the weight of the charges as well as the determination of the relative volume thereof; to prevent undesirable emissions of smoke from the mouths of the retorts when they are charged; to enable a single operator to properly and easily charge a comparatively great number of retorts in a given time, and to complete the charge by introducing both the breeze and coal while the movable carriage is at rest in respect to any retort or row of retorts.

The invention will be claimed at the end hereof but will be first described in connection with the embodiment selected from other embodiments of it for the sake of illustration in the accompanying drawings, in which—

Figure 1:
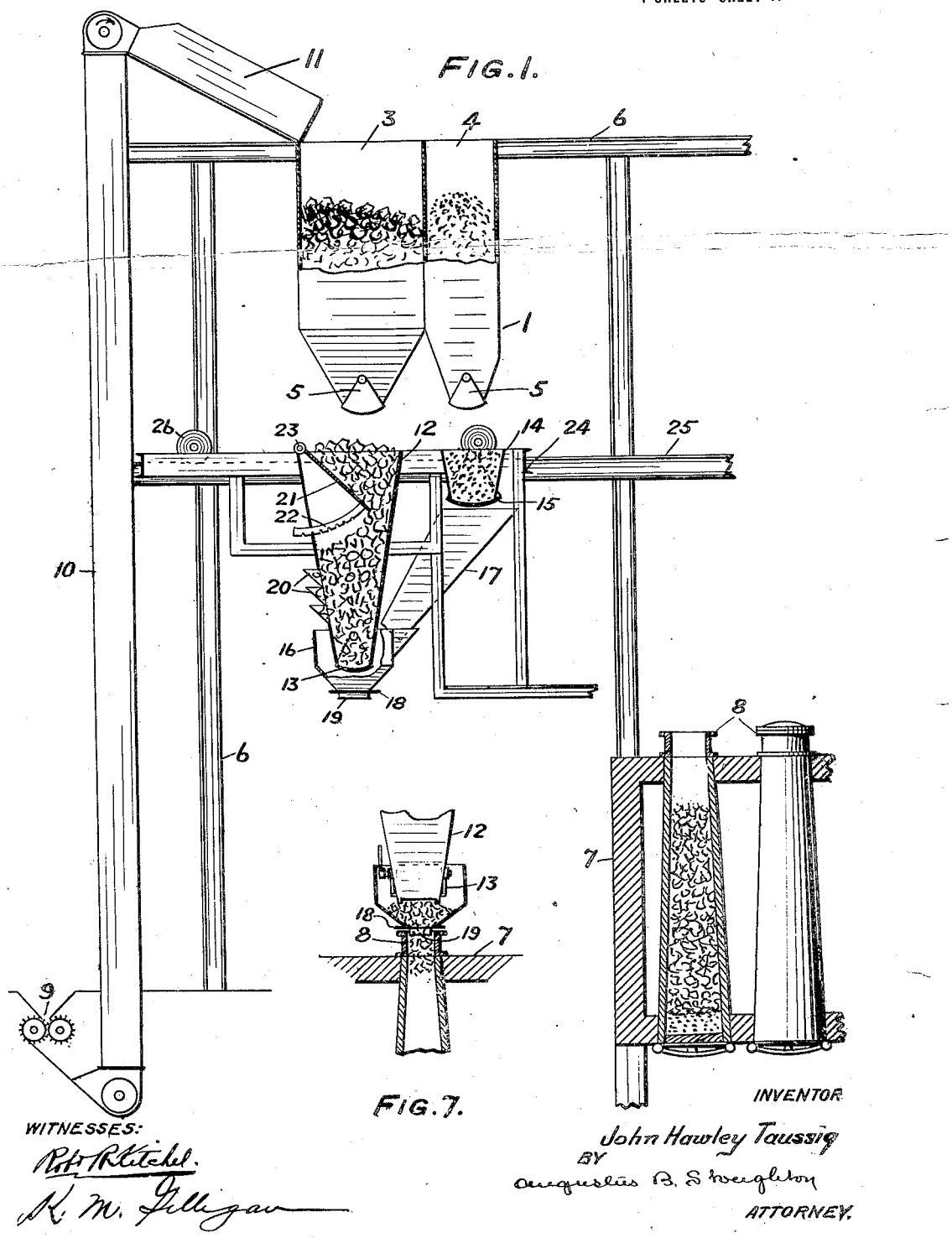
Figure 2:
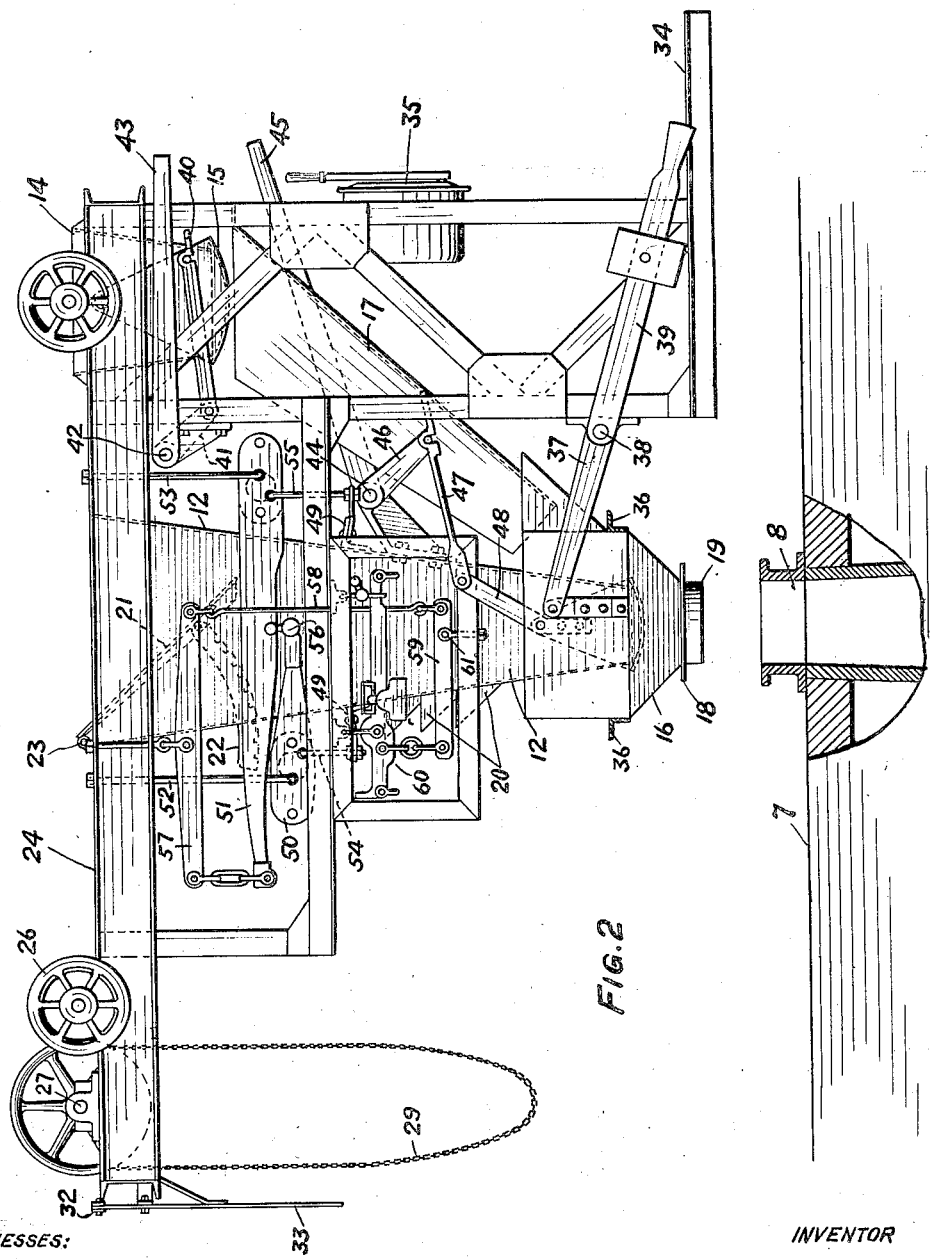
Figure 3:
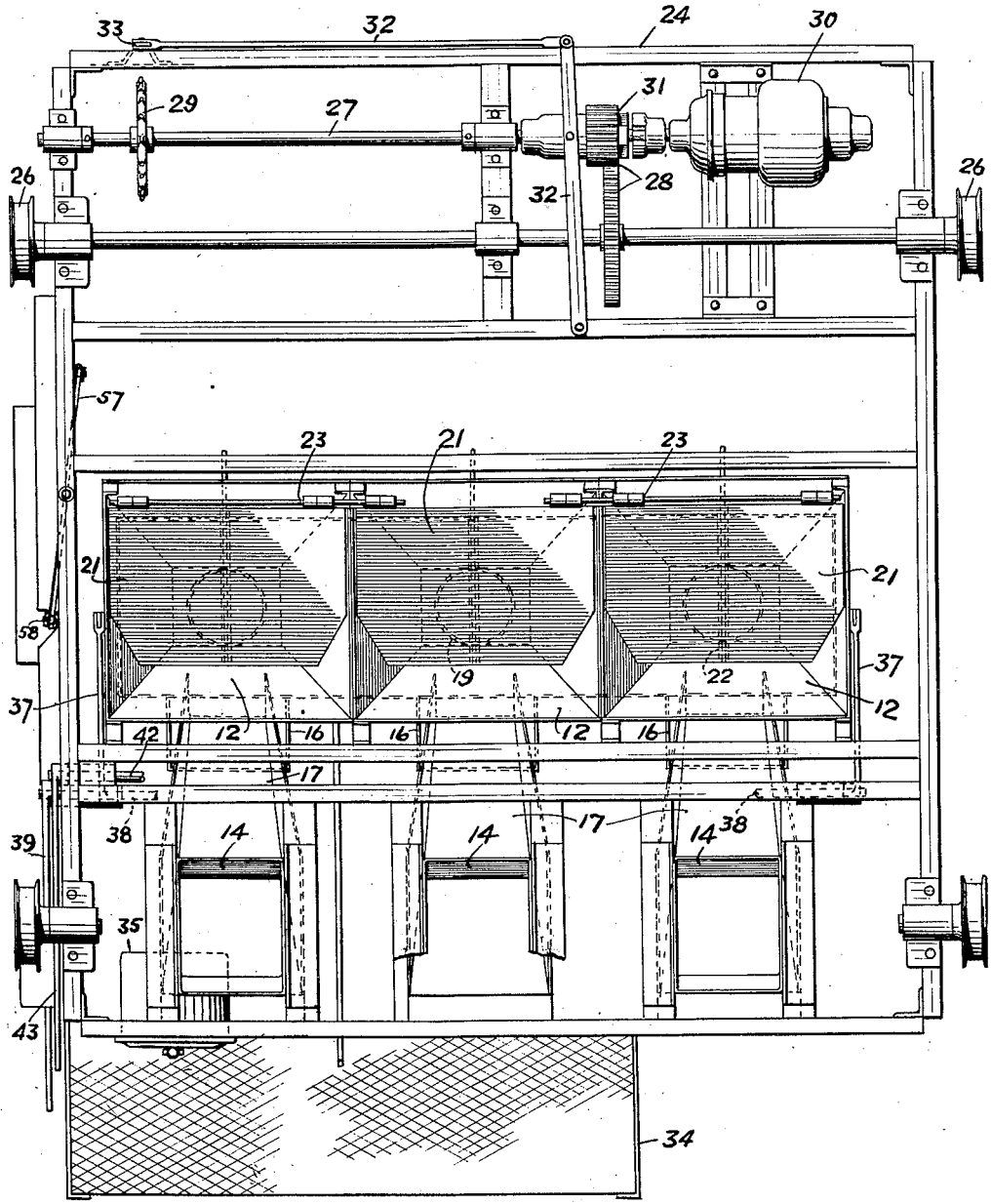

Figure 1, is an elevational view partly in section and somewhat diagrammatic illustrating features of the invention. Fig. 2, is a side view drawn to an enlarged scale of traveling retort charging mechanism embodying features of the invention, and Fig. 3, is a top or plan view of the same with some of the parts omitted for the sake of clearness in illustration in the drawings. Fig. 4, is a partial end view illustrating the hopper suspension. Fig. 5, is a partial view of the side of the device opposite to the side illustrated in Fig. 2. Fig. 6, is a top or plan view, drawn to an enlarged scale and illustrating a detail of construction of the hopper suspension, and Fig. 7, is a detail view illustrating diagrammatically a feature of the invention.

In the drawings 1, is a fixed receiver having a coal compartment 3, a breeze compartment 4, and suitable discharge gates 5. As shown this receiver depends from a frame 6, suitably arranged in respect to the retort benches 7, each of which as shown contains retorts 8, in rows of three arranged perpendicular to the plane of the paper in Fig. 1. Coal, even as it is received, passes through the crusher 9, and is lifted by the elevator 10, to the chute 11, by which it is sent to the compartment 3. There are traveling coal hoppers 12, one for each retort in the row, and they are respectively provided with discharge gates 13. This coal hopper is adapted to receive coal from the discharge gates 5, of the compartment 3. 14, is a traveling breeze pocket having discharge gates 15, and adapted to receive breeze from the discharge gates 5 of the breeze compartment 4. 16, are chute funnels through which the hoppers 12, discharge their contents, and each chute funnel is movable in respect to its hopper discharge 13. 17, are breeze chutes receiving breeze from the pocket 14, and discharging it into the chute hoppers 16.

In use the coal is discharged from the compartment 3, into the hoppers 12 and breeze is discharged from the compartment 4 into the hoppers 14. The traveling parts are then brought, as a unit, from coal and breeze compartments, into line with a row of retort mouths, whereupon the chute funnels are lowered so as to fit the retort mouths. For this purpose each funnel chute 16, may be provided with a flange 18. If necessary or desirable breeze is introduced into each funnel chute and the contents of each hopper is discharged into the corresponding retort, that is, a layer of breeze at the bottom and coal at the top. The area of the opening 19, of each funnel chute is less than the area of the discharge opening of each hopper 12, so that the charge from the hopper backs up in the funnel chute and seals the opening between it and the walls of the hopper, see Fig. 7. In this way and to a large extent the admission of air, which would be drawn into the retort with the charge, is prevented, so that when the charge enters the retort a rush of air into the retort and out again is avoided, and consequently smoke is not emitted in any considerable quantity from the retort when the charge goes into it.

20, are telltale openings provided in the side of each hopper, so that the condition of the charge can be observed, and these openings are shown as provided with or covered by shelf-like receptacles. 21, is a hinged wall section shown as arranged above the telltale openings and provided with a quadrant 22, by means of which it can be turned and adjusted about its hinge 23, so as to vary the capacity of the hopper. Each hopper is filled with coal, it being understood that the hinged wall section has been properly adjusted so as to fix the proper volumetric quantity of the charge. It will hereafter appear that means are provided for weighing the contents of the hoppers so that the total weight of the charge as well as the total volume can be easily and accurately fixed and maintained. There is a carriage 24, which may be wheeled and moved on ways or rails 25, carried by the frame 6, or in any appropriate way arranged above the retorts. The wheels 26, may be driven from the shaft 27, by the gears 28, and the shaft 27, may be driven by the hand sprocket chain and wheel 29, or by an electric motor 30, according to the position of the clutch member 31, which can be shifted by the links and hand lever 32 and 33, it being understood of course that current is supplied to the motor by means that are well understood and need not be here described.

34, is a platform depending from the carriage and upon which the operator may ride.

35, is a controller by means of which the motor 30, may be operated and the electrical connections between the controller and the motor are too well understood to require description.

The breeze pockets 14, and breeze chutes 15, are shown as three in number (corresponding with the row of three retorts) and they depend from cross pieces of the carriage 24. The chute funnels 16, three in number, are connected together as by a frame 36, and are suspended from arms 37, arranged at each side of the machine and connected with a shaft 38, having a counterweighted operating member 39, accessible from the platform 34. The shaft 38, extends across the carriage and is journaled in bearings carried thereby. The gate 15, of the breeze pockets 14, are operated by links 40, connected with arms 41, on a rockshaft 42, having an operating lever 43. The rock shaft 42, extends crosswise of the carriage and is turnable in brackets carried by the frame of the carriage, and the links 40, have detachable connection with the gates 15, as by means of a pin and notch connection, so that any one of the gates can be disconnected from the shaft 42, and therefore permitted to remain closed while the other gates are operated.

44, is a shaft extending across the machine and turnable in brackets carried by the coal hoppers 12, and it is provided with an operating lever 45, and with arms 46. Each arm 46, is connected by a link 47, with an arm 48, rigidly connected with a hopper gate 13. Thus when the lever 45, is turned the arms 46, operating through the links 47, open the gates 13. The links 47, have notch and pin connection or are otherwise detachably connected with the arm 46, so that by disconnecting any link 47, the corresponding hopper gate can be permitted to remain closed when the other hopper gates are open. All of the hoppers are connected together as by rails 49, and are suspended from the frame of the carriage at each side of the machine by a system of weighing scale levers.

The equalizing levers 50 and 51, are pivoted together at 56, and their ends are pivotally supported by hangers 52 and 53, and intermediate of the ends of these hangers are links 54 and 55, connected with the rails 49, which carry the hoppers. On the opposite side of the machine to that shown in Fig. 2, and as shown in Fig. 5, there are hangers 52$^a$ and 53$^a$, and there are short levers 50$^a$ and 51$^a$, to which the hangers are pivoted as well as links 54$^a$ and 55$^a$, from which latter the hoppers are suspended. 75 and 76, are rods extending crosswise of the carriage and of which one connects the parts 50 and 50$^a$, and the other connects the parts 51 and 51$^a$. To a prolongation of the lever 51, is connected one end of a lever 57, centrally pivoted to the frame of the carriage and having its other end connected by a link 58, with the lever 59, of a scale mechanism 60. The scale mechanism frame is rigid with the carriage and the lever 59, is pivoted at 61, to that frame. The scale mechanism shown is of the recording variety but that is not essential. By the described hopper suspension there is interposed between the carriage and the hoppers a weighing scale which is one of the objects sought.

Among the advantages of the described invention not specifically herein set forth, reference may be made to the fact that the carriage may be brought to rest over a line of retorts and the charge of both coal and breeze completed without moving the carriage. In use the carriage 24 is run in under the coal and breeze pockets 3 and 4, which are fixed and immovable. The carriage 24 is so placed that breeze from the breeze hopper 4 enters the breeze pocket of the carriage and coal enters the coal pocket of the carriage. It will be understood that there are as many of these parts in a row as there are retorts to be filled. The carriage is then run out over a row of retorts, which are filled from the carriage, or more accurately, from the pockets thereof. The attendant riding on the carriage accomplishes this by means of the handles 39, 45 and 43. The carriage is then run back under the hoppers 3 and 4 and again filled and run out over another row of retorts which are filled in the same way.

As has been explained the volume and weight of the charge introduced into each of the retorts can be ascertained and predetermined.

What I claim is:

1. Means for charging vertical retorts which comprises the combination of a retort mouth, a chute funnel movable in respect to the retort mouth and adapted to closely fit the same, and a hopper discharging into the funnel and having a discharge opening exceeding in area the discharge area of the funnel, whereby a charge from the hopper backs up in and seals the funnel, substantially as described.

2. Means for charging vertical retorts comprising the combination of a movable carriage, a coal hopper carried by the carriage, means for changing the volumetric capacity of the hopper, and devices for weighing the contents of the hopper, whereby the charge may be fixed volumetrically and its weight ascertained, substantially as described.

3. Means for charging vertical retorts comprising the combination of a movable carriage, a row of coal hoppers carried by the carriage, means for varying the volumetric capacity of each hopper, devices for weighing the contents of the hoppers, breeze pockets carried by the carriage independently of the coal hoppers and provided with a row of chutes, and a row of chute funnels common to the chutes and hopper discharges, whereby a row of retorts may be simultaneously charged, substantially as described.

In testimony whereof I have hereunto signed my name.

JOHN HAWLEY TAUSSIG.

Witnesses:
 CLIFFORD K. CASSEL,
 FRANK E. FRENCH.